May 7, 1963     W. S. RICHARDSON     3,088,334
MULTIPLE REDUCTION GEAR UNIT
Filed Nov. 17, 1960     2 Sheets-Sheet 2

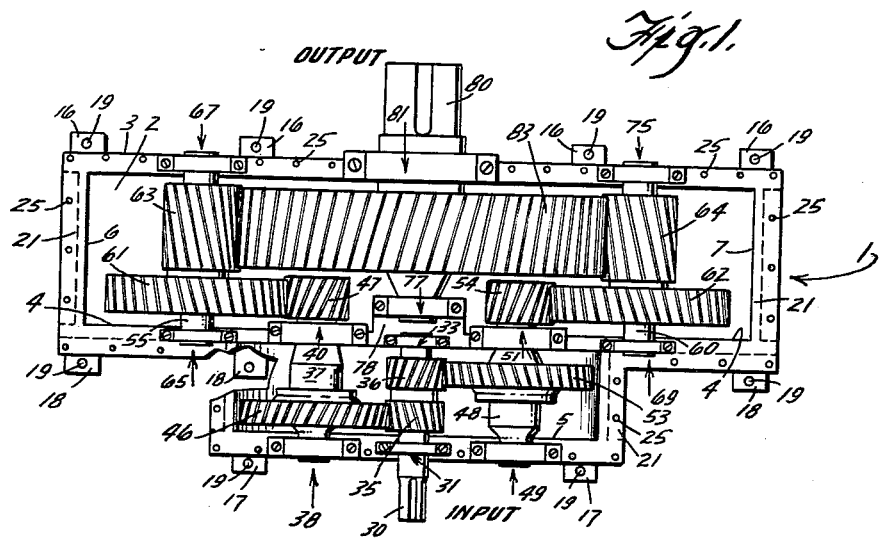

Fig. 3.

INVENTOR.
WILLIAM S. RICHARDSON
BY Adrian L. Bateman, Jr.
ATTORNEY.

United States Patent Office 3,088,334
Patented May 7, 1963

3,088,334
MULTIPLE REDUCTION GEAR UNIT
William S. Richardson, Village of Fox Point, Wis., assignor to The Falk Corporation, Milwaukee, Wis., a corporation of Wisconsin
Filed Nov. 17, 1960, Ser. No. 70,015
8 Claims. (Cl. 74—664)

This invention relates to housed speed reducers and resides in a multiple reduction gear unit comprised of two separate divided load gear trains driven from a common input shaft, which trains are provided with suitable gearing to provide a reduction of input speed in the course of driving a single output shaft, the gearing being mounted on shafts which are supported by bearing supports properly positioned relative to the mounted gearing whereby angular deflections caused by gear tooth loads will be substantially the same for meshing pairs of gears, together with a housing having a generally T-shaped horizontal cross-section and vertical walls which provide bearing support for the gear shafts, such housing having a plurality of outwardly extending feet at its base suitably arranged for proper load support and for ease of installation.

A multiple reduction dual gear train unit has application wherever it is necessary to provide a heavy duty, low speed drive. A gear unit in accordance with one embodiment of this invention may be used, for example, as a triple reduction drive unit for rod mills, ball mills, sugar mills, large transfer cars, and continuous rolling mills. The large reduction of speed made possible by triple reduction gearing permits the use of higher speed motors as the driving source with attendant savings in motor cost and space.

Previous multiple reduction gear units have included gearing arrangements in which there was improper engagement of meshing gears under load caused by deflections of the gear shafts due to dynamic gear tooth loads. The multiple reduction gear unit of this invention provides for the gear shafts to be supported by bearing supports properly positioned relative to the gearing so that angular deflections caused by the tangential component of torque loads on the gear teeth will be substantially the same for each pair of meshing gears, thereby insuring full tooth engagement under load and attendant reduction in wear and substantially increased gear life.

In the past, heavy duty multiple reduction gear units have been either open or have been mounted within an enclosed housing having a generally rectangular base. This type of housing resulted in gear shafts of excessive length. The gear unit of this invention provides multiple reduction gearing mounted within an enclosed housing having a generally T-shaped horizontal cross-section which permits shorter gear shafts and requires a minimum of floor space. The housing of the invention is also provided with a plurality of outwardly extending feet suitably positioned along the periphery of the housing base to provide improved distribution of the gear shaft bearing loads to a foundation. By providing feet which project outwardly from the housing base, the present gear unit may be installed upon a foundation with greater ease than was formerly possible. Thus, the installation of anchor bolts, or other restraining means, as well as grouting, can be accomplished from the exterior of the gear unit without removing any portion of the housing or the interior gearing.

It is, therefore, an object of this invention to provide a fully enclosed multiple reduction gear unit for heavy duty drives.

It is another object of the invention to provide a multiple reduction gear unit in which angular deflections caused by gear loads will be substantially the same for each meshing pair of gears.

Another object of this invention is to provide multiple reduction gearing mounted within a housing which requires a minimum of floor space and permits relatively short gear shafts and reduced shaft deflections.

It is a further object of the invention to provide a multiple reduction gear unit which is provided with a plurality of outwardly extending feet at its housing base for ease of installation, said feet being located to provide uniform rigidity of support for the housing.

The means for accomplishing the foregoing and other objects and advantages of this invention will appear from the following description. In the description, reference is made to the accompanying drawings which form a part hereof and in which there is shown, by way of illustration and not of limitation, a triple reduction speed reducer embodying the invention.

In the drawings:

FIG. 1 is a plan view of a triple reduction gear unit with the housing cover removed;

FIG. 2 is a view in elevation of the input end of the gear unit shown in FIG. 1 with the housing cover in section; and FIG. 3 is an exploded view in perspective of the gearing of this invention illustrating the deflections caused by dynamic gear tooth loads.

Referring to FIGS. 1 and 2, the gearing of the illustrated embodiment of the invention may be seen to be enclosed in a housing having a base section 1 including a generally T-shaped horizontal floor plate 2. Rigidly secured to the floor plate and forming a generally rectangular upstanding box defining the cross bar portion of the T-shaped housing are a back wall 3, an intermediate wall 4 and a pair of side walls 6 and 7. The staff portion of the T housing is defined by a front wall 5 and a second pair of side walls 8 and 9. The intermediate wall 4 is coextensive of the length of the back wall 3 and the walls 3, 4 and 5 are substantially parallel to each other. The side walls 6 and 7 are rigidly secured to the back wall 3 and the intermediate wall 4 at their respective abutting edges. The side walls 8 and 9 have inwardly bent portions 10 and 15, respectively, and extend from the vertical edges of the front wall 5 to be secured in abutting relationship to the outer surface of the intermediate wall 4. The walls are each secured at their bottom edges to the floor plate 2, thereby forming the base section 1 of the housing. The aforesaid housing base section portions are all rigidly united at their junctures as by welding so that the structure provides a deflection resistant support for the gears and shafts to be described hereafter.

Rigidly attached to the floor plate 2 adjacent its junction with the back wall 3 are five outwardly extending feet 16, spaced generally equidistant from each other, coextensive of the length of the back wall 3. Three similar outwardly extending feet 17 are rigidly attached to the floor plate 2 adjacent its junction with the front wall 5. Four outwardly extending feet 18 are rigidly attached to the floor plate 2 adjacent its junction with the portions of the intermediate wall which extend beyond the side walls 8 and 9 (see FIG. 1). The side walls 8 and 9 are provided with the inwardly bent portions 10 and 15 to allow for exterior access to one of said feet 18 positioned in line with the ends of the front wall 5. The feet 16, 17 and 18 are provided with holes 19 to receive anchor bolts 20.

With the exception of the back wall 3 and the front wall 5, the upper periphery of the base section 1 has a laterally extending flange 21 coextensive of its length. A suitable housing cover 22 is provided with a mating peripheral flange 23 extending about its lower portion. The housing cover 22 is attached to the base section 1 by a plurality of studs 24 which are journaled through spaced holes (not shown) provided in the flange 23 and into oppositely disposed, spaced threaded holes 25 provided in the flange 21 and the walls 3 and 5.

The gear train includes a primary driving shaft 30 provided with a keyway for connection to a power source not shown. The shaft 30 is journaled through a bearing support 31 having its lower surface milled into the front wall 5 and its upper surface provided by a cap bolted to the wall 5. The shaft 30 is further journaled in a bearing support 33 formed by milling into the intermediate wall 4 and bolting a cap to the wall 4. Affixed to the portion of the shaft 30 between the bearing supports 31 and 33 is a pair of helical primary driving pinions 35 and 36 having their teeth inclined in opposite directions. A secondary driving shaft 37 is journaled in a bearing support 38 formed by the front wall 5 and a cap bolted thereto. The shaft 37 is further journaled through a bearing support 40 formed by the intermediate wall 4 and a bolted cap. Affixed to the shaft 37 in the portion between the bearing supports 38 and 40 is a helical gear 46 meshing with the helical primary driving pinion 35. Secured to that portion of the shaft 37 which is cantilevered beyond the bearing support 40 is a secondary driving pinion 47.

A similar secondary driving shaft 48 is journaled in a bearing support 49, formed by the front wall 5 and a bolted cap, and through a bearing support 51, formed by the intermediate wall 4 and a bolted cap. Affixed to the shaft 48, in meshing engagement with the helical primary driving pinion 36, is a helical gear 53. A secondary driving pinion 54 is affixed to the portion of the shaft 48 cantilevered beyond bearing support 51.

A pair of tertiary driving shafts 55 and 60 are each provided with a gear 61 and 62, respectively, and a tertiary driving pinion 63 and 64, respectively. One end of the shaft 55 is journaled in a bearing support 65 formed by the intermediate wall 4 and a cap, and the opposite end is journaled in a bearing support 67 formed by the back wall 3 and a cap. In a similar manner, the shaft 60 is journaled at one end in a bearing support 69, formed by the intermediate wall 4 and a cap, and at the opposite end in a bearing support 75, formed by the back wall 3 and a cap. The gear 61 is in meshing engagement with the secondary driving pinion 47, and the gear 62 is in meshing engagement with the secondary driving pinion 54.

Journaled at one end in a bearing support 77, formed by a stool portion 78 extending from and rigidly secured to the intermediate wall 4 and a cap, is a driven or output shaft 80. The shaft 80 is further journaled through a bearing support 81 formed by the back wall 3 and a cap. The projecting end of the shaft 80 has a keyway for connection to an apparatus to be driven. Secured to the shaft 80 between the bearing supports 77 and 81 is a bull gear 83 which meshes with both of the tertiary driving pinions 63 and 64.

All of the shafts are substantially parallel to each other, and preferably lie in a common horizontal plane. Each of the bearing supports for the shafts has a lower surface milled into a respective wall and an upper surface provided by a cooperating bolted cap.

While all of the gears and pinions are shown to be helical, spur type gears may be substituted therefor, with the exception of the primary driving pinions 35 and 36 and their meshing helical gears 46 and 53.

Installation of the triple reduction gear unit of this invention may be accomplished while the gearing is fully enclosed within the housing formed by the base section 1 and the cover 22. The outwardly extending feet 16, 17 and 18 serve initially as guides for placement of the anchor bolts 20 in a foundation. The anchor bolts 20 are installed and grouted from the exterior of the gear unit thereby permitting simple installation. The T-shaped housing requires less floor space than prior rectangular housings and also permits placement of the feet 16, 17 and 18 for proper distribution of shaft bearing loads.

After a power source has been operatively connected to the primary driving shaft 30, rotation of the shaft will be transmitted to the shafts 37 and 48 by the meshing of helical gears 46 and 53 with the helical primary driving pinions 35 and 36, respectively, thereby causing the shafts 37 and 48 to rotate in the same direction. The opposite inclination of the teeth of the pinions 35 and 36 has the well-known effect of providing automatically balanced loading between each of the two gear trains, it being understood that shaft 30 is journaled for axial floating. Rotation of the shafts 37 and 48 will be transmitted to the tertiary driving shafts 55 and 60 by the meshing of gear 61 with pinion 47 and the meshing of gear 62 with pinion 54, respectively. The rotation of the shafts 55 and 60 will be finally transmitted to the driven shaft 80, and thence to the apparatus to be driven, by the meshing of the pinions 63 and 64 with the bull gear 83.

Figure 3:
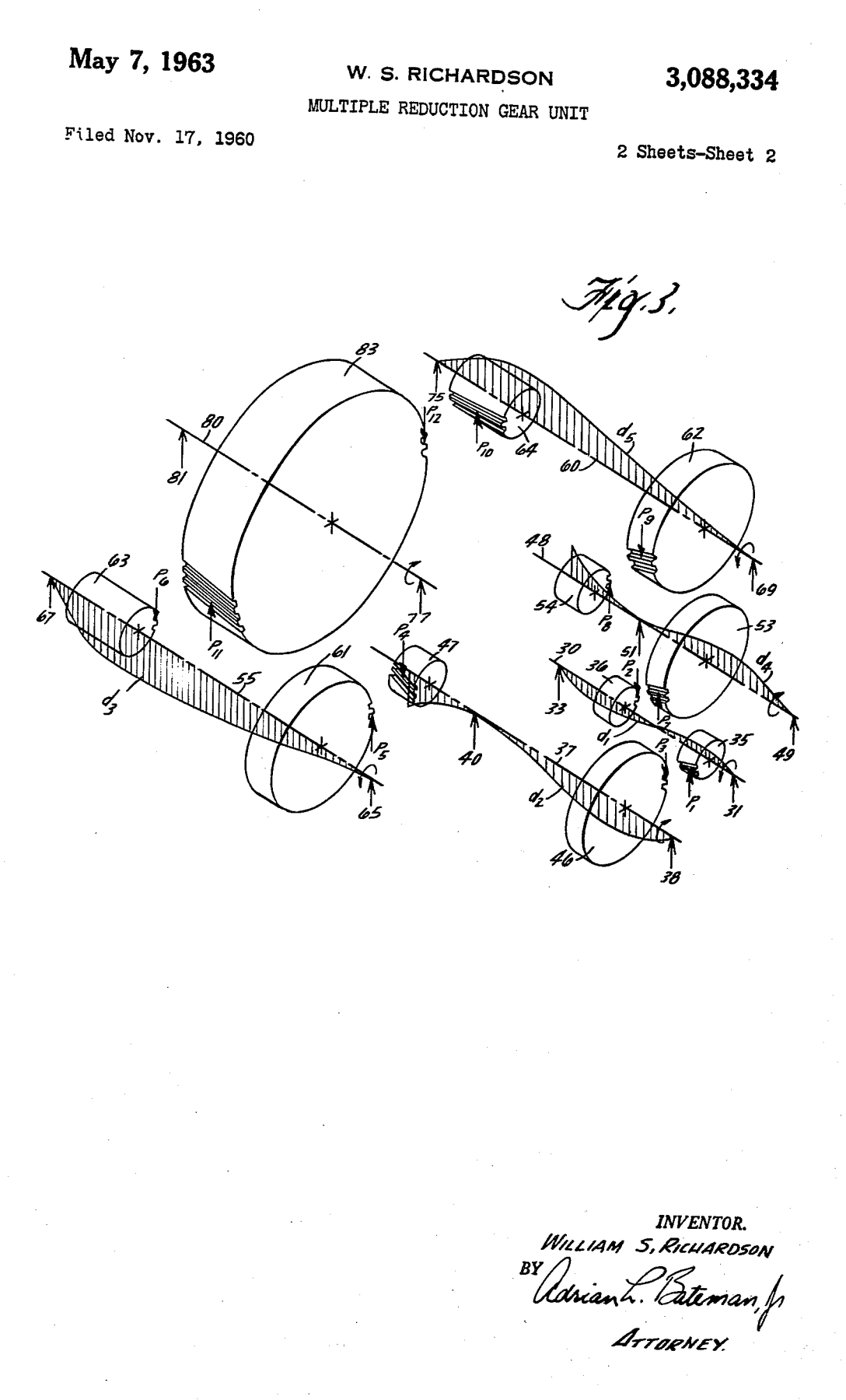

As shown in FIG. 3, the gear shafts are supported by bearing supports at proper positions relative to the associated gearing to insure substantially the same angular deflection for each meshing pair of gears under conditions of dynamic loading. In FIG. 3, the shafts are indicated by lines representing their respective axes. The bearing supports for the shafts are indicated by arrows having open heads, and curved arrows are used to show the direction of rotation of each shaft. Also, in FIG. 3, only a portion of the teeth of each gear is shown with arrows having closed heads used to indicate the tangential component of loads on the gear teeth. All of the deflections shown in FIG. 3, and hereinafter described, will occur in vertical planes through the axes of the shafts.

Assuming that the power source will cause the shaft 30 to rotate in a counterclockwise direction, the pinions 35 and 36 meshing with the gears 46 and 53, respectively, will cause the shafts 37 and 48 to rotate in a clockwise direction. The resistance to rotation of the shaft 80 will cause the gear 46 to exert an upward force $P_1$ on the teeth of pinion 35 and will also cause the gear 53 to exert a downward force $P_2$ on the teeth of pinion 36. Between the bearing supports 31 and 33, the forces $P_1$ and $P_2$ will cause the shaft 30 to deflect along a line $d_1$. Since the maximum vertical deflections of the shaft 30 occur at the center of the pinions 35 and 36, the pinions will be subjected to vertical displacement, but will not be angularly deflected. The pinion 35 by driving the gear 46 will exert a downward force $P_3$ on the teeth of the gear 46. Rotation of shaft 37 will cause the shaft 55 to rotate in a counterclockwise direction while, at the same time, the gear 61 will exert a downward force $P_4$ on the pinion 47 due to the resistance to rotation of the shaft 80. The force $P_3$ acting on the gear 46 disposed upon the portion of the shaft 37 between the bearing supports 38 and 40 will result in a downward deflection of the shaft 37 between the supports 38 and 40 and further will cause the cantilevered portion of the shaft 37 to be displaced upward. Since the pinion 47 is affixed to the portion of the shaft 37 which is cantilevered beyond the bearing support 40, that portion will be deflected downward by the force $P_4$, which will also tend to displace upwardly the portion of the shaft 37 between the supports 38 and 40. Therefore, the forces $P_3$ and $P_4$ will offset each other thereby reducing the actual deflection of the shaft 37 and resulting in a net deflection indicated by line $d_2$. Since the gear 46 is located near the point of maximum deflection of the shaft 37 between the supports 38 and 40, the gear 46 will be subjected to vertical displacement, but will be subjected to only a minimum angular deflection. However, the pinion 47 will be inclined angularly relative to the horizontal as well as being displaced downward.

The gear 61 wil have an upward force $P_5$ exerted against its teeth by the driving engagement with pinion 47. The shaft 80 will be rotated in a clockwise direction by the meshing of pinion 63 with the bull gear 83 and the pinion 63 will have a downward force $P_6$ exerted upon it by the resistance to rotation of the shaft 80 and its associated bull gear 83. The force $P_5$ has the effect of deflecting the shaft 55 upward. However, the force $P_6$ is substantially in excess of the force $P_5$ due to the fact that the diameter of the pinion 63 is substantially smaller than that of the gear 61 and its width is greater than that of the gear 61. The force $P_6$ has the effect of causing the shaft to deflect downward, and since the force $P_6$ is greater than the force $P_5$ it will overcome the upward deflection caused by force $P_5$ and result in a net downward deflection indicated by the line $d_3$. While the pinion 63 is positioned generally at a point of maximum net displacement of the shaft 55 and will receive only a minimum angular deflection, the gear 61 is not so positioned, and, therefore, the gear 61 will be inclined angularly relative to the horizontal as well as being displaced downward.

The shafts 48 and 37 will be deflected in a similar manner, but the deflections are in opposite directions. The driving of the pinion 36 against the gear 53 will exert an upward force $P_7$ against the gear 53, and the resistance to rotation of the shaft 80 will cause the gear 62 to exert an upward force $P_8$ on the pinion 54. The forces $P_7$ and $P_8$ will cause the shaft 48 to deflect along a line $d_4$ thereby displacing the gear 53 upward and angularly inclining the pinion 54 as well as displacing it upwardly.

The shafts 60 and 55 will be deflected to the same extent, but in opposite directions. The driving of the pinion 54 against the gear 62 will rotate the shaft 60 in a counterclockwise direction and will exert a downward force $P_9$ on the gear 62. An upward force $P_{10}$ is exerted on the pinion 64 by the resistance to rotation of the shaft 80 and its associated bull gear 83. Since the force $P_{10}$ is greater than the force $P_9$, the net deflection of the shaft 60 will be upward, as indicated by line $d_5$, thereby displacing the pinion 64 upward and angularly inclining the gear 62 as well as displacing it upwardly.

There will be no substantial deflection of the shaft 80 from dynamic gear loads since equal and opposite forces $P_{11}$ and $P_{12}$ are exerted on the bull gear 83 by the pinions 63 and 64, respectively. These forces $P_{11}$ and $P_{12}$ will cause the shaft 80 to rotate in clockwise direction thereby supplying torque to a driven apparatus operatively attached to shaft 80.

It will be apparent that the gearing of this invention is so supported by bearing supports that proper engagement of meshing pairs of gears under dynamic load is insured. Thus, the meshing gear 46 and pinion 35 are each displaced vertically without being angularly inclined and, therefore, can mesh in proper and full engagement. The same is true for the meshing gear 53 and pinion 36. The pinions 63 and 64 are each displaced vertically by the gear loads without being inclined and, therefore, will properly mesh with the bull gear 83. The meshing pinion 47 and gear 61 are each displaced downward and angularly inclined but the direction of inclination of each is the same and, therefore, the pinion 47 and gear 61 will be properly and fully engaged at all times. Similarly, the meshing pinion 54 and gear 62 are each displaced upward and angularly inclined but the direction of inclination is the same for each.

Reversing the direction of the rotation of the primary driving shaft 30 will merely reverse the direction of rotation of each of the shafts and the shafts will be deflected to the same extent as shown above but in the opposite direction.

From the foregoing description it can be seen that the speed reducer of the present invention provides a heavy duty drive in which angular deflections caused by dynamic gear tooth loads will be substantially the same for meshing pairs of gears. Furthermore, it can be seen that the speed reducer of the present invention is enclosed within a housing which permits relatively short gear shafts, requires a minimum of floor space and results in simple installation.

I claim:

1. Multiple reduction gearing comprising: a primary driving shaft provided with a pair of helical primary driving pinions having their teeth oppositely inclined, said primary driving shaft having a bearing support on each side of said pair of primary driving pinions; a pair of secondary driving shafts each provided with a helical gear meshing with one of said pair of helical primary driving pinions and each of said secondary driving shafts being further provided with a secondary driving pinion, said secondary driving shafts each having a bearing support on each side of its associated helical gear and having a cantilever portion extending beyond one of said bearing supports upon which is mounted its associated secondary driving pinion; a pair of tertiary driving shafts each provided with a gear and a tertiary driving pinion, each of said tertiary shaft gears meshing with one of said secondary driving pinions, said tertiary driving shafts each being journaled in bearing supports adjacent each end; and a driven shaft provided with a bull gear meshing with both of said tertiary driving pinions, said driven shaft having a bearing support on each side of said bull gear.

2. Multiple reduction gearing comprising: a primary driving shaft provided with a pair of helical primary driving pinions having their teeth oppositely inclined, said primary driving shaft having a bearing support on each side of said pair of primary driving pinions; a pair of secondary driving shafts disposed on opposite sides of said primary driving shaft and each provided with a helical gear meshing with one of said pair of helical primary driving pinions, each of said secondary driving shafts being further provided with a secondary driving pinion, said secondary driving shafts each having a bearing support on each side of its associated helical gear and having a cantilever portion extending beyond one of said bearing supports upon which is mounted its associated secondary driving pinion; a pair of tertiary driving shafts disposed on opposite sides of said pair of secondary driving shafts and each provided with a gear and a tertiary driving pinion, each of said gears meshing with one of said secondary driving pinions, said tertiary driving shafts each being journaled in bearing supports adjacent each end; and a driven shaft disposed between said tertiary driving shafts and provided with a bull gear meshing with both of said tertiary driving pinions, said driven shaft having a bearing support on each side of said bull gear, said primary, secondary and tertiary driving shafts and said driven shaft having their axes lying in a common plane.

3. A speed reduction unit comprising: a housing having substantially parallel front and back walls and an intermediate wall substantially parallel to and disposed between said front and back walls; a primary driving shaft journaled in a bearing support provided in said front wall and a bearing support provided in said intermediate wall, said primary driving shaft having a pair of primary driving pinions affixed thereto beteween the bearing supports of said primary driving shaft; a pair of secondary driving shafts each journaled at one end in bearing supports provided in said front wall and journaled through bearing supports provided in said intermediate wall and having a cantilever portion extending beyond the said intermediate wall bearing supports, each of said secondary driving shafts having a gear meshing with one of said pair of primary driving pinions and affixed to a portion of said secondary driving shafts disposed between their respective bearing supports, each of said secondary driving shafts also having a secondary driving pinion affixed to its respective cantilever portion; a pair of tertiary driving shafts each journaled at its ends in bearing supports provided in said intermediate wall and in said back wall, each of said tertiary driving shafts having a gear meshing with one of said secondary driving pinions and having a tertiary driving pinion; and a driven shaft journaled in a bearing support provided in said intermediate wall and in a bearing support provided in said back wall, said driven shaft having a bull gear affixed thereto between the bearing supports of said driven shaft and in meshing engagement with both of said tertiary driving pinions.

4. A speed reduction unit comprising: a housing having a generally T-shaped horizontal cross-section with substantially parallel front and back walls and an intermediate wall substantially parallel to and disposed between said front and back walls said front wall being the terminus of the staff of the T-shaped housing, said housing being provided with a plurality of outwardly extending feet peripherally disposed around said housing, said feet being spaced for uniform distribution of shaft bearing loads; a primary driving shaft journaled in a bearing support provided in said front wall and a bearing support provided in said intermediate wall, said primary driving shaft having a pair of primary driving pinions affixed thereto between the bearing support of said primary driving shaft; a pair of secondary driving shafts disposed on opposite sides of said primary driving shaft and each journaled at one end in bearing supports provided in said front wall and journaled through bearing supports provided in said intermediate wall; said secondary driving shafts each having a cantilever portion extending beyond the intermediate wall bearing supports, each of said secondary driving shafts having a gear meshing with one of said pair of primary driving pinions and affixed to a portion of said secondary driving shafts disposed between their respective bearing supports, each of said secondary driving shafts also having a secondary driving pinion affixed to its respective cantilever portion; a pair of tertiary driving shafts disposed on opposite sides of said pair of secondary driving shafts and each journaled at its ends in bearing supports provided in said intermediate wall and in said back wall, each of said tertiary driving shafts having a gear meshing with one of said secondary driving pinions and having a tertiary driving pinion; and a driven shaft disposed between said pair of tertiary driving shafts and journaled in a bearing support provided in said intermediate wall and in a bearing support provided in said back wall, said driven shaft having a bull gear affixed thereto between the bearing supports of said driven shaft and in meshing engagement with both of said tertiary driving pinions, said primary secondary and tertiary shafts and said driven shaft having their axes lying in a common plane.

5. Multiple reduction gearing comprising: a primary driving shaft provided with a pair of driving pinions; a driven shaft provided with a bull gear; a plurality of intermediate driving shafts comprising two separate gear trains, each of said gear trains including a first intermediate driving shaft having a gear meshing with one of said pair of driving pinions and an intermediate driving pinion, a second intermediate driving shaft in each of said gear trains, said first and second intermediate driving shafts being provided with meshing gears drivingly interconnecting the same, each of said gear trains being adapted to be driven by one of said pair of driving pinions and to drive the driven shaft by meshing engagement with the bull gear; and a plurality of bearing supports rotatively supporting said primary driving shaft and said driven shaft and one of said intermediate driving shafts of each gear train adjacent their respective ends and rotatively supporting the other of said intermediate shafts of each gear train adjacent one of its ends and at a position spaced inwardly from the other end, the intermediate driving pinion of each gear train being supported on a cantilevered portion of its respective intermediate driving shaft, whereby angular deflections caused by dynamic gear tooth loads will be substantially the same for each meshing pair of gears.

6. A multiple reduction gear unit comprising: a housing provided with a plurality of peripherally disposed, outwardly extending feet and having a plurality of vertical walls; a primary driving shaft provided with a pair of driving pinions; a driven shaft provided with a bull gear; a plurality of countershafts comprising two separate gear trains, each gear train including a first countershaft having a gear meshing with one of said pair of driving pinions and an intermediate driving pinion, the countershafts of each gear train being provided with meshing gears drivingly interconnecting the countershafts, each of said gear trains being adapted to be driven by one of said pair of driving pinions and to drive the driven shaft by meshing engagement with the bull gear; and a plurality of bearing supports positioned adjacent the ends of said primary driving shaft, said driven shaft and one of the countershafts of each gear train, the other countershaft of each gear train having bearing supports disposed to support each of said intermediate driving pinions on a cantilevered portion of the first countershaft whereby angular deflections caused by dynamic gear tooth loads will be substantially the same for each meshing pair of gears, said bearing supports being provided by the aforesaid vertical walls of the housing.

7. The multiple reduction gear unit of claim 6 in which there are three transverse vertical housing walls, each such wall providing bearing support for a plurality of shafts and each such wall being supported by a plurality of feet.

8. A speed reduction unit comprising: a housing having a generally T-shaped horizontal cross-section, a plurality of vertical walls and a plurality of outwardly extending feet attached to the floor of said housing at the bases of said walls, said feet being disposed around the lower periphery of said housing for uniform distribution of shaft bearing loads; a primary driving shaft provided with a pair of driving pinions; a driven shaft provided with a bull gear; a plurality of countershafts comprising two separate gear trains including first countershafts each having a gear meshing with one of said pair of driving pinions and an intermediate driving pinion, said countershafts of each gear train being drivingly connected by meshing gears, each of said trains being adapted to be driven by one of said pair of driving pinions and to drive the driven shaft by meshing engagement with the bull gear; and a plurality of bearing supports adjacent the ends of said primary driving shaft, said driven shaft and one of the countershafts of each gear train, the other countershaft of each gear train having bearing supports disposed to support each of said intermediate driving pinions on a cantilevered portion of the countershaft whereby angular deflections caused by dynamic gear tooth loads will be substantially the same for each meshing pair of gears, said bearing supports being provided by the aforesaid vertical walls of the housing, the stem of said T-shaped housing being located at the primary driving shaft end thereof.

References Cited in the file of this patent

UNITED STATES PATENTS

| | | |
|---|---|---|
| 1,359,853 | Wilkinson | Nov. 23, 1920 |
| 1,634,376 | Miller | July 5, 1927 |
| 1,759,689 | Day | May 20, 1930 |
| 2,911,845 | North | Nov. 10, 1959 |
| 2,920,497 | Wiken | Jan. 12, 1960 |